United States Patent
Mutis Rueda et al.

(10) Patent No.: US 11,174,686 B2
(45) Date of Patent: Nov. 16, 2021

(54) THREADED TUBULAR CONNECTION

(71) Applicant: HYDRIL COMPANY, Houston, TX (US)

(72) Inventors: David Mutis Rueda, Houston, TX (US); Jonathan Breen, Houston, TX (US); Andrew Tate, Houston, TX (US)

(73) Assignee: Hydril Company, Houston, TX (US)

( * ) Notice: Subject to any disclaimer, the term of this patent is extended or adjusted under 35 U.S.C. 154(b) by 147 days.

(21) Appl. No.: 16/482,562

(22) PCT Filed: Feb. 2, 2018

(86) PCT No.: PCT/IB2018/050679
§ 371 (c)(1),
(2) Date: Jul. 31, 2019

(87) PCT Pub. No.: WO2018/142348
PCT Pub. Date: Aug. 9, 2018

(65) Prior Publication Data
US 2020/0024911 A1 Jan. 23, 2020

(30) Foreign Application Priority Data
Feb. 3, 2017 (NL) ...................... 2018298

(51) Int. Cl.
*F16L 15/00* (2006.01)
*E21B 17/042* (2006.01)

(52) U.S. Cl.
CPC ........ *E21B 17/0423* (2013.01); *F16L 15/002* (2013.01)

(58) Field of Classification Search
CPC ......... F16L 15/002; F16L 15/04; F16L 15/06; F16L 15/08; E21B 17/0423
(Continued)

(56) References Cited

U.S. PATENT DOCUMENTS 3,989,284 A * 11/1976 Blose .................... E21B 17/042
285/332.2
RE30,647 E * 6/1981 Blose .................. E21B 17/0423
285/332.2
(Continued)

FOREIGN PATENT DOCUMENTS

| CN | 101828062 | 9/2010 |
| EP | 0131621 | 9/1987 |

(Continued)

OTHER PUBLICATIONS

International Search Report and Written Opinion of the International Searching Authority issued in International Application No. PCT/IB2018/050679 dated Apr. 18, 2018; 12 pages.
(Continued)

*Primary Examiner* — Aaron M Dunwoody
(74) *Attorney, Agent, or Firm* — Fish & Richardson P.C.

(57) ABSTRACT

A threaded tubular connection for drilling or operating hydrocarbon wells comprising a longitudinal axis, a metal pin member having a tapered two-step wedge pin thread with dovetail wedge threads and a pin sealing surface located between the small and large diameter pin thread steps, and a metal box member having a tapered two-step wedge box thread with dovetail wedge threads and a box sealing surface located between the small and large diameter box thread steps, wherein the tubular connection is free from any final make-up stop shoulder defining a final make-up position for the pin member relative to the box member, the small diameter wedge thread set and the large diameter wedge thread set are dimensioned to have a first axial clearance and a second axial clearance.

20 Claims, 10 Drawing Sheets

(58) Field of Classification Search
USPC .......................................... 285/390, 333, 334
See application file for complete search history.

(56) References Cited

U.S. PATENT DOCUMENTS

| | | | |
|---|---|---|---|
| 4,703,954 A | | 11/1987 | Ortloff et al. |
| RE34,467 E | | 12/1993 | Reeves |
| 5,330,239 A | | 7/1994 | Blose et al. |
| 5,338,074 A | | 8/1994 | Barringer et al. |
| 5,360,239 A | | 11/1994 | Klementich |
| 5,454,605 A | | 10/1995 | Mott |
| 5,687,999 A | | 11/1997 | Lancry et al. |
| 6,009,611 A | | 1/2000 | Adams et al. |
| 6,206,436 B1 * | | 3/2001 | Mallis ................ E21B 17/042 |
| | | | 285/334 |
| 6,789,823 B2 | | 9/2004 | Sches et al. |
| 2002/0027363 A1 | | 3/2002 | Mallis et al. |
| 2002/0033603 A1 | | 3/2002 | Pallini et al. |
| 2003/0038476 A1 | | 2/2003 | Galle |
| 2003/0168858 A1 * | | 9/2003 | Hashem ............... F16L 15/006 |
| | | | 285/334 |
| 2004/0104575 A1 * | | 6/2004 | Ellington ............ F16L 13/168 |
| | | | 285/333 |
| 2006/0006600 A1 | | 1/2006 | Rosie |
| 2006/0087119 A1 | | 4/2006 | Sivley et al. |
| 2006/0145476 A1 * | | 7/2006 | Reynolds, Jr. ...... E21B 17/0423 |
| | | | 285/333 |
| 2006/0145477 A1 * | | 7/2006 | Reynolds, Jr. .......... F16L 15/06 |
| | | | 285/333 |
| 2006/0145480 A1 * | | 7/2006 | Mallis ................ E21B 17/0423 |
| | | | 285/390 |
| 2007/0158943 A1 * | | 7/2007 | Mallis ................... F16L 15/004 |
| | | | 285/333 |
| 2007/0167051 A1 | | 7/2007 | Reynolds |
| 2008/0054633 A1 | | 3/2008 | Reynolds |
| 2009/0058085 A1 * | | 3/2009 | Breihan ............... F16L 15/002 |
| | | | 285/334 |
| 2012/0074690 A1 * | | 3/2012 | Mallis ..................... B23P 11/00 |
| | | | 285/328 |
| 2014/0203556 A1 * | | 7/2014 | Besse .................... E21B 17/042 |
| | | | 285/390 |
| 2016/0160575 A1 * | | 6/2016 | Hou ..................... E21B 17/0423 |
| | | | 285/334 |
| 2018/0266593 A1 * | | 9/2018 | Glukhih ............... E21B 17/042 |
| 2019/0330292 A1 | | 10/2019 | Breen et al. |

FOREIGN PATENT DOCUMENTS

| | | |
|---|---|---|
| EP | 0949441 | 10/1999 |
| EP | 2325435 | 5/2011 |
| WO | WO200104520 | 1/2001 |
| WO | WO2015153271 | 10/2015 |

OTHER PUBLICATIONS

Written Opinion of the International Preliminary Examining Authority issued in International Application No. PCT/IB2018/050679 dated Jan. 21, 2019; 8 pages.

International Preliminary Report on Patentability issued in International Application No. PCT/IB2018/050679 dated Apr. 11, 2019; 9 pages.

* cited by examiner

THREADED TUBULAR CONNECTION

CROSS-REFERENCE TO RELATED APPLICATIONS

This application is a U.S. National Stage of PCT/IB2018/050679 filed on Feb. 2, 2018, which claims priority to Dutch Patent Application No. 2018298 filed on Feb. 3, 2017, which are incorporated by reference herein in their entirety.

FIELD OF THE INVENTION

The invention relates to a threaded tubular connection for drilling or operating hydrocarbon wells. The tubular connection is used to connect two tube sections together in order to form a larger tube. These types of tubes can be drill tubes, casings, liners, or other oilfield tubes which are frequently used to drill, complete, or produce wells.

Typically, in a male-female threaded tubular connection, the male component of the connection is referred to as a "pin member" and the female component is called a "box member". The term "make-up" refers to engaging a pin member into a box member and threading the members together by applying a torque.

The pin and box members have in general cooperating sealing surfaces which after the make-up is completed are in contact with each other to form a metal to metal seal. The metal to metal seal seals the interior of the connected tube sections from the outside world.

Referring to the geometry of threads, the term "load flank" designates the side wall surface of a thread that faces away from the outer end of the respective pin or box member on which the thread is formed and supports the weight (i.e. a tensile load) of the lower tube section when placed in a vertical position (for example when hanging in a well bore). Similarly, the term "stab flank" designates the side wall surface of the thread that faces toward the outer end of the respective pin or box member and supports forces compressing the joints toward each other such as the weight of the upper tubular member during the initial make-up of the joint or such as a force applied to push a lower tubular member against the bottom of a bore hole (i.e. a compressive force).

BACKGROUND OF THE INVENTION

"Wedge threads" are characterized by threads, regardless of a particular thread form, that increase in width in opposite directions on a pin member and a box member. The rate at which the threads change in width along the connection is defined by a variable commonly known as a "wedge ratio." Wedge ratio (although technically not a ratio) refers to the difference between the stab flank lead and the load flank lead, which causes the threads to vary in width along the connection. A "lead" of a thread refers to the differential distance between a component of a thread on consecutive threads. As such, the "stab flank lead" is the distance between stab flanks of consecutive thread pitches along the axial length of the threaded tubular connection.

A detailed discussion of wedge ratios is provided in U.S. Pat. No. 6,206,436 issued to Mallis, and assigned to the assignee of the present invention. That patent is incorporated herein by reference in its entirety.

Wedge threads are disclosed in U.S. Pat. No. RE 30,647 issued to Blose, U.S. Pat. No. RE 34,467 issued to Reeves, U.S. Pat. No. 4,703,954 issued to Ortloff, and U.S. Pat. No. 5,454,605 issued to Mott, all assigned to the assignee of the present invention and incorporated herein by reference in their entirety.

Although various wedge thread connections exist having a final make-up stop shoulder defining a final make-up position for the pin member relative to the box member when the rotational make-up is completed, wedge threads typically do not have such a final make-up stop shoulder. This makes their make-up "indeterminate" and, as a result, the position of the pin member relative to the box member may vary more during make-up for a given torque range to be applied than for tubular connections having a final make-up stop shoulder.

As indicated, "make-up" refers to threading a pin member and a box member together. A final make-up refers to the situation that the make-up has been completed by threading the pin member and the box member together up to a desired amount of torque.

The fact that the make-up of tubular connections having a radial metal to metal seal and wedge threads and without a final make-up stop shoulder is indeterminate is a major concern because a radial metal to metal seal requires very accurate relative positioning of the sealing surfaces of the male and female elements. In order to work properly, an accurate positioning of the sealing surfaces is required to generate the correct contact pressures. Sealing surfaces therefore have to be positioned relative to each other at a specific position and variances in that final position can cause that seal surfaces do not generate the required contact pressures.

In tubular connections with wedge threads, it is the wedging effect between threads that will govern the make-up process. The axial position of seal surfaces is therefore normally measured relative to the threads.

When having a tubular connection with a two-step threads, one thread step has to be chosen as the reference thread step to axially position the seal surfaces. Since both wedge thread steps are indeterminate, it is not known which of the thread steps will govern the make-up and therefore the positioning of the sealing surfaces. If the positioning of the sealing surfaces is not based on to the thread step that controls the make-up process, the axial position of seal surfaces relative to each other at the final make-up cannot be ensured. This may lead to seal stand-off, and sealability problems may arise.

SUMMARY OF THE INVENTION

The invention has the objective to provide an improved, or at least alternative, threaded tubular connection. The tubular connection according to the invention comprises a longitudinal axis, a metal pin member, and a metal box member. The pin member has a tapered two-step wedge pin thread comprising a small diameter pin thread step, a large diameter pin thread step and a pin sealing surface located between the small and large diameter pin thread steps. The small diameter pin thread step and the large diameter pin thread step each comprise external dovetail wedge threads. The metal box member has a tapered two-step wedge box thread comprising a small diameter box thread step, a large diameter box thread step and a box sealing surface located between the small and large diameter box thread steps. The small diameter box thread step and the large diameter box thread step each comprise internal dovetail wedge threads. The wedge threads of the two-step wedge pin thread and of the two-step wedge box thread have stab flanks and load flanks. The small diameter pin and box thread steps are configured to cooperate during rotational make-up of the tubular connection and form a small diameter wedge thread set. The large diameter pin and box thread steps are configured to cooperate during rotational make-up of the tubular connection and form a large diameter wedge thread set. The pin sealing surface and the box sealing surface are configured to form a radial metal to metal seal. The tubular connection is free from any final make-up stop shoulder defining a final make-up position for the pin member relative to the box member. One of the small diameter wedge thread set and the large diameter wedge thread set is dimensioned to have a first axial clearance between its wedge threads during a major portion of the rotational make-up of the tubular connection and the other of the small diameter wedge thread set and the large diameter wedge thread set is dimensioned to have a second axial clearance between its wedge threads during said major portion of the rotational make-up of the tubular connection. The first axial clearance is larger than the second axial clearance. The major portion of the rotational make-up of the tubular connection relates to applying a torque to the tubular connection during make-up which is between 20-80% of an optimum make-up torque.

The rotational make-up of the tubular connection, and therefore the positioning of the pin and box sealing surfaces relative to each other, is governed by the wedge thread set that is energised first. Since the first axial clearance is larger than the second axial clearance, it is ensured that the wedge thread set with the second axial clearance will be energised first and therefore govern the make-up. Therefore, by selecting the wedge thread with the second axial clearance as a reference thread set, it is ensured that the reference thread set is the one that governs the make-up. This allows to achieve a more accurate positioning of the pin and box sealing surfaces relative to each other when the make-up is of the tubular connection with two-step wedge threads and without a final make-up stop shoulder is completed.

The specifications of the tube sections with threaded tubular connections sold in the field always indicate the optimum make-up torque to complete the rotational make-up of the connection. The optimum make-up torque is located between the maximum make-up torque and the minimum make-up torque.

The wedge thread set with the second axial clearance is in practice sufficiently energised to govern the make-up at a torque of about 20% of the optimum make-up torque. When a torque of 80% is reached, the pin and box members are in practice located at their final position relative to each other. This means that there will not be any (significant) displacement between the pin and box members when during make-up a torque larger than 80% of the optimum make-up torque (and up to the optimum make-up torque) is applied. As a result of this, the pin and box sealing surfaces have in practice reached their final position relative to each other when during make-up a torque of 80% of the optimum make-up torque is applied.

Due to the fact that the second axial clearance is smaller than the first axial clearance when during make-up a torque between 20-80% of the optimum make-up torque is applied, it is ensured that the wedge thread set with the second axial clearance governs the make-up from the moment that it is sufficiently energised until the final position of the pin and box sealing surfaces relative to each other is reached.

In an embodiment of the tubular connection, the first axial clearance and the second axial clearance are 0 mm at the optimum make-up torque. This means that in each of the small diameter wedge thread set and the large diameter wedge thread set, the load flanks are in contact with each other at the optimum make-up torque and the stab flanks are in contact with each other at the optimum make-up torque.

In an embodiment of the tubular connection, the pin member comprises a further pin sealing surface, the box member comprises a further box sealing surface, the further pin sealing surface and the further box sealing surface are configured to cooperate with each to form a further radial metal to metal seal, and the wedge thread set having the first axial clearance is located between the radial metal to metal seal and the further radial metal to metal seal. The make-up of the wedge thread set between the radial metal to metal seal and the further radial metal to metal seal is influenced by both radial metal to metal seals, in particular in the situation that said wedge thread set is provided with dovetail wedge threads. The radial interference at both radial metal to metal seals will move the pin member inwards and move the box member outwards. This can have an effect on the wedge threads of said wedge thread set. If dovetail wedge threads are used, this movement of the pin and box members will generate additional wedging between the dovetail wedge threads. If the wedge threads set with the second axial clearance is located between both radial metal to metal seals, this may lead to a premature end of the make-up and therefore to seal stand-off.

In an embodiment of the tubular connection, the tubular connection comprises only one radial metal to metal seal.

In an embodiment of the tubular connection, the first axial clearance is twice as large as the second axial clearance.

In an embodiment of the tubular connection, the wedge threads of the wedge thread set having the first axial clearance comprises a first stab flank clearance at their stab flanks and a first load flank clearance at their load flanks, and the wedge threads of the wedge thread set having the second axial clearance comprises a second stab flank clearance at their stab flanks and a second load flank clearance at their load flanks.

In an embodiment of the tubular connection, the first stab flank clearance is smaller than the second stab flank clearance. The wedge thread set having the first axial clearance might have a much lower torque interference when compared with the wedge thread set having the second axial clearance when the make-up is completed. Making the first stab flank clearance smaller than the second stab flank clearance will result in higher torque interference in the wedge thread set having the first axial clearance.

In an embodiment of the tubular connection, the first stab flank clearance is equal to the second stab flank clearance minus between 0.010 and 0.015 mm (or minus 0.013 mm). This tends to create a suitable higher torque interference in the wedge thread set having the first axial clearance.

In an embodiment of the tubular connection, the first stab flank clearance is equal to the second stab flank clearance minus between 0.0004 and 0.0006 inch (or minus 0.0005 inch).

In an embodiment of the tubular connection, the first load flank clearance is larger than the second load flank clearance.

In an embodiment of the tubular connection, the second load flank clearance is 0 mm (meaning that the load flanks are in contact with each other). This has a positive effect on governing the rotational make-up with the wedge thread set having the second axial clearance.

In an embodiment of the tubular connection, the first stab flank clearance is between 0.010 and 0.015 mm (or is 0.013 mm), the first load flank clearance is between 0.035 and 0.040 mm (or is 0.038 mm), and the second stab flank clearance is between 0.023 and 0.028 mm (or is 0.025 mm). This allows to govern the rotational make-up more accurately.

In an embodiment of the tubular connection, the first stab flank clearance is between 0.0004 and 0.0005 inch (or is 0.0005 inch), the first load flank clearance is between 0.0014 and 0.0016 inch (or is 0.0015 inch), and the second stab flank clearance is between 0.0009 and 0.0011 inch (or is 0.001 inch).

In an embodiment of the tubular connection, the first load flank clearance is larger than the first stab flank clearance.

In an embodiment of the tubular connection, the second stab flank clearance is larger than the second load flank clearance.

In an embodiment of the tubular connection, the first axial clearance is formed by the first stab flank clearance and the first load flank clearance and the second axial clearance is formed by the second stab flank clearance and the second load flank clearance.

In an embodiment of the tubular connection, the pin member comprises a pin free end and the wedge thread set having the first axial clearance is located closer to the pin free end than the wedge thread set having the second axial clearance.

In an embodiment of the tubular connection, the pin member comprises a pin free end and the wedge thread set having the first axial clearance is located further from the pin free end than the wedge thread set having the second axial clearance.

The features of the above described embodiments of the tubular connection may be combined, wherein any combination of any number of said embodiments may be made.

The invention further relates to a method of making up a threaded tubular connection according to the invention, comprising the steps of selecting the wedge thread set having the second axial clearance as a reference thread set for the rotational make-up of the tubular connection, and controlling the make-up of the threaded tubular connection on basis of the reference thread set to position the pin sealing surface and the box sealing surface relative to each other.

In an embodiment of the method, the positioning of the pin and box sealing surfaces relative to each other is controlled by applying a torque on the tubular connection from 20% of the optimum make-up torque until 80% of the optimum make-up torque.

BRIEF DESCRIPTION OF THE DRAWINGS

Embodiments of the threaded tubular connection and the method of making up the threaded tubular connection will be described by way of example only, with reference to the accompanying schematic drawings in which corresponding reference symbols indicate corresponding parts, and in which.

DETAILED DESCRIPTION OF THE DRAWINGS

Figure 1A:
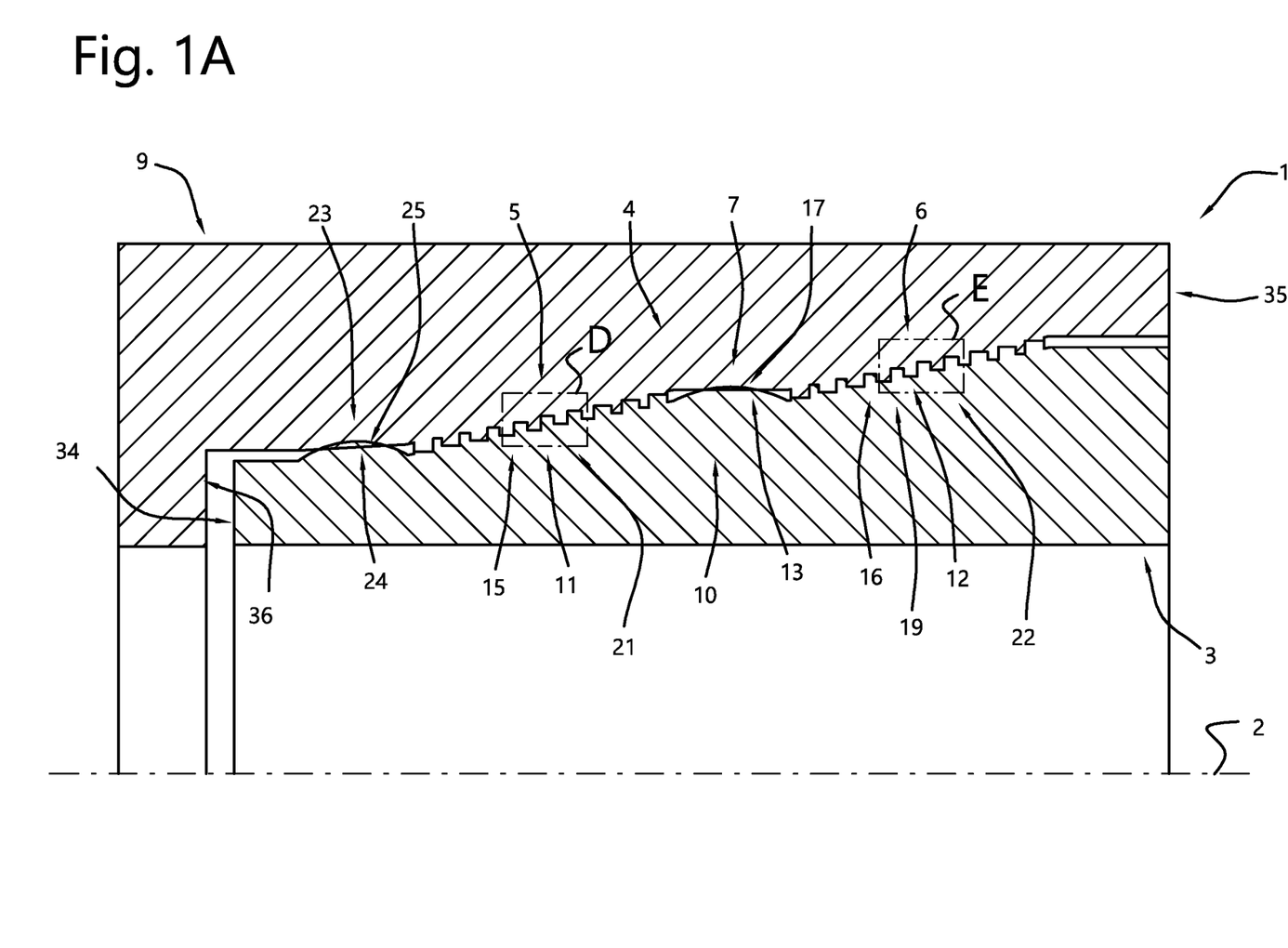
FIG. 1A schematically shows a cross sectional view of a first embodiment of the tubular connection according to the invention, FIG. 1B schematically shows a cross sectional view of the pin member of the tubular connection of FIG. 1A, FIG. 1C schematically shows a cross sectional view of the box member of the tubular connection of FIG. 1A, FIG. 1D schematically shows an enlarge view of part D of FIG. 1A during the rotational make-up, FIG. 1E schematically shows an enlarge view of part E of FIG. 1A during the rotational make-up, FIG. 1F schematically shows a first alternative embodiment for FIG. 1D, FIG. 1G schematically shows a first alternative embodiment for FIG. 1E, FIG. 1H schematically shows a second alternative embodiment for FIG. 1D, FIG. 1I schematically shows a second alternative embodiment for FIG. 1E, FIG. 2 schematically shows a cross sectional view of a second embodiment of the tubular connection according to the invention, FIG. 3 schematically shows a cross sectional view of a third embodiment of the tubular connection according to the invention, FIG. 4 schematically shows a cross sectional view of a fourth embodiment of the tubular connection according to the invention, and FIG. 5 schematically shows a graph relating the make-up of the tubular connection of FIG. 1A.

FIG. 1A shows a cross sectional view of a first embodiment of the tubular connection 1 according to the invention. The tubular connection 1 comprises a longitudinal axis 2, a metal pin member 3, and a metal box member 9. The tubular connection 1 is shown in the situation that the rotational make-up of the tubular connection 1 has been completed.

Figure 1B:
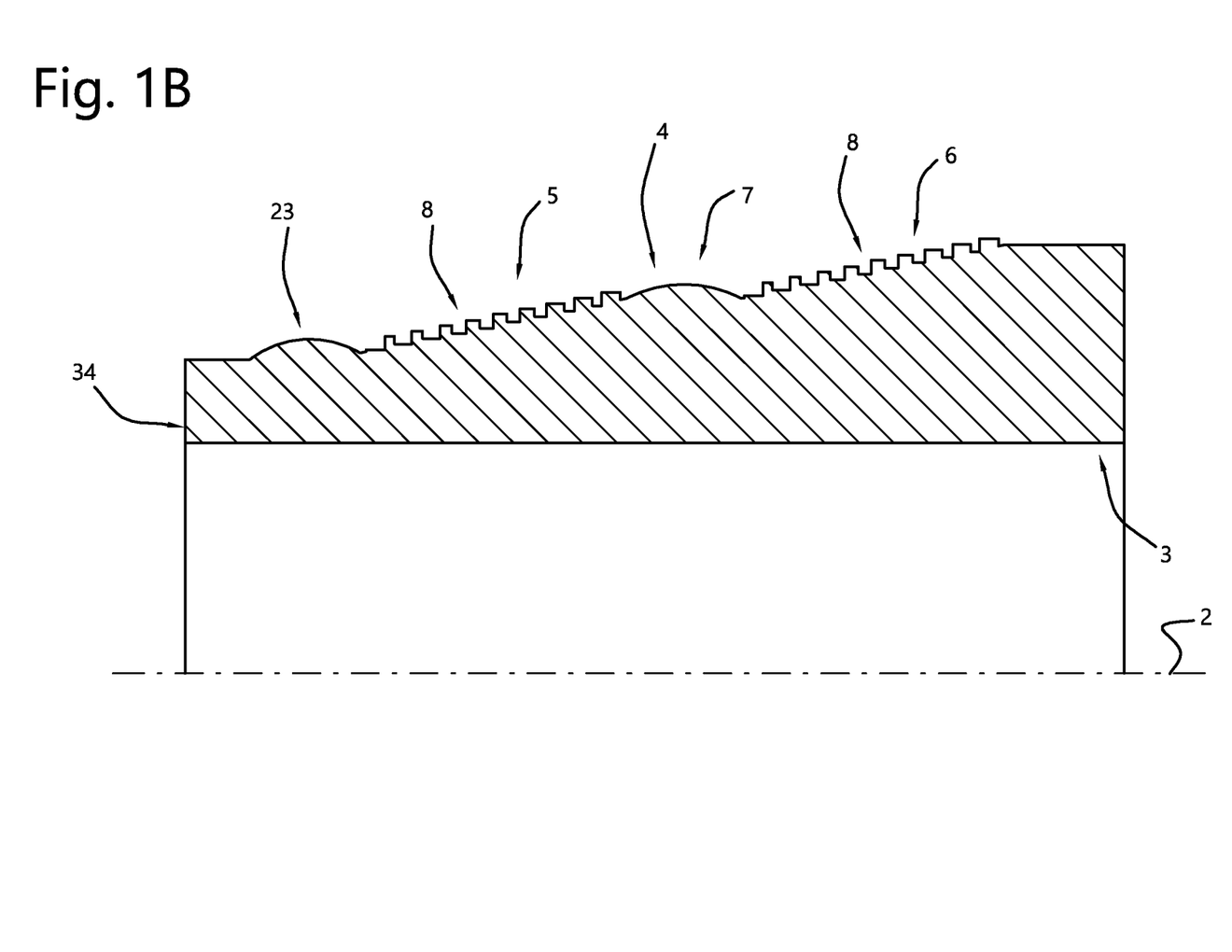

A cross sectional view of the pin member 3 is shown in FIG. 1B. The pin member 3 has a tapered two-step wedge pin thread 4 comprising a small diameter pin thread step 5, a large diameter pin thread step 6 and a pin sealing surface 7 located between the small and large diameter pin thread steps 5, 6. The small diameter pin thread step 5 and the large diameter pin thread step 6 each comprise external dovetail wedge threads 8. The pin member 3 has a pin free end 34.

Figure 1C:
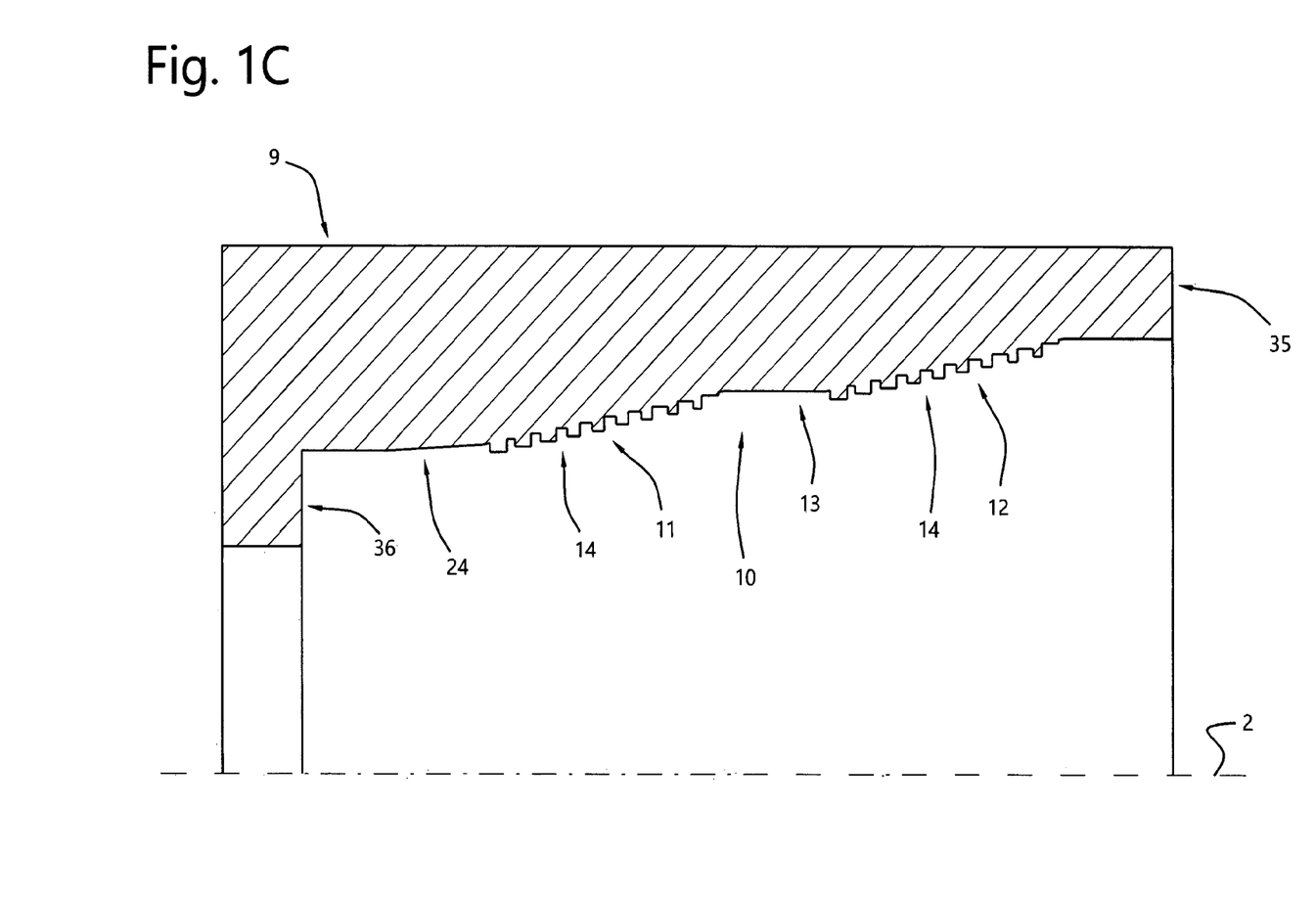

A cross sectional view of the box member 9 is shown in FIG. 1C. The metal box member 9 has a tapered two-step wedge box thread 10 comprising a small diameter box thread step 11, a large diameter box thread step 12 and a box sealing surface 13 located between the small and large diameter box thread steps 11, 12. The small diameter box thread step 11 and the large diameter box thread step 12 each comprise internal dovetail wedge threads 14. The box member 9 has a box free end 35.

As shown in FIG. 1A, the small diameter pin and box thread steps 5, 11 are configured to cooperate during rotational make-up of the tubular connection 1 and from a small diameter wedge thread set 15. The large diameter pin and box thread steps 6, 12 are configured to cooperate during rotational make-up of the tubular connection 1 and form a large diameter wedge thread set 16.

The pin sealing surface 7 and the box sealing surface 13 are configured to form a radial metal to metal seal 17. The pin member 3 comprises a further pin sealing surface 23 and the box member 9 comprises a further box sealing surface 24. The further pin sealing surface 23 and the further box sealing surface 24 are configured to form a further radial metal to metal seal 25.

The tubular connection 1 is free from any final make-up stop shoulder defining a final make-up position for the pin member 3 relative to the box member 9. The box member 9 does have an excessive make-up stop shoulder 36 to limit the damage to the tubular connection 1 in the case of excessive rotational make-up.

When the rotational make-up of the tubular connection 1 is completed, the pin member 3 is located relative to the box member 9 as shown in FIG. 1A. The pin free end 34 of the pin member 3 is located at a distance from the excessive make-up torque shoulder 36 of the box member 9. There is therefore no abutment of the pin free end 34 against the excessive make-up stop shoulder 36. This makes the rotational make-up of the tubular connection 1 "indeterminate".

The small diameter wedge thread set 15 is dimensioned to have a first axial clearance 21 between its wedge threads 8, 14 during a major portion of the rotational make-up of the tubular connection 1. The large diameter wedge thread set 16 is dimensioned to have a second axial clearance 22 between its wedge threads 8, 14 during said major portion of the rotational make-up of the tubular connection 1. The first axial clearance 21 is larger than the second axial clearance 22 so that the large diameter wedge thread set 16 governs the positioning of the pin sealing surface 7 and the box sealing surface 13 relative to each other.

The major portion of the rotational make-up of the tubular connection 1 relates to applying a torque to the tubular connection 1 during make-up which is between 20-80% of the optimum make-up torque.

The tubular connection 1 allows that the large diameter wedge thread set 16 (having the second axial clearance 22) is selected as a reference thread set 19 for the rotational make-up of the tubular connection 1. The rotational make-up of the tubular connection 1 can therefore be controlled on basis of the reference thread set 19 to position the pin sealing surface 7 and the box sealing surface 13 relative to each other. This applies in a similar manner to the further pin sealing surface 23 and the further box sealing surface 24.

The small diameter wedge thread set 15 (having the first axial clearance 21) is located closer to the pin free end 34 than the large diameter wedge thread set 16 (having the second axial clearance 22).

The make-up of the tubular connection 1 is completed when the optimum make-up torque has been reached. The first axial clearance 21 and the second axial clearance 22 may be 0 mm at the optimum make-up torque. This means that in each of the small diameter wedge thread set 15 and the large diameter wedge thread set 16, the load flanks 29A, 29B are in contact with each other at the optimum make-up torque and the stab flanks 28A, 28B are in contact with each other at the optimum make-up torque.

Figure 1D:
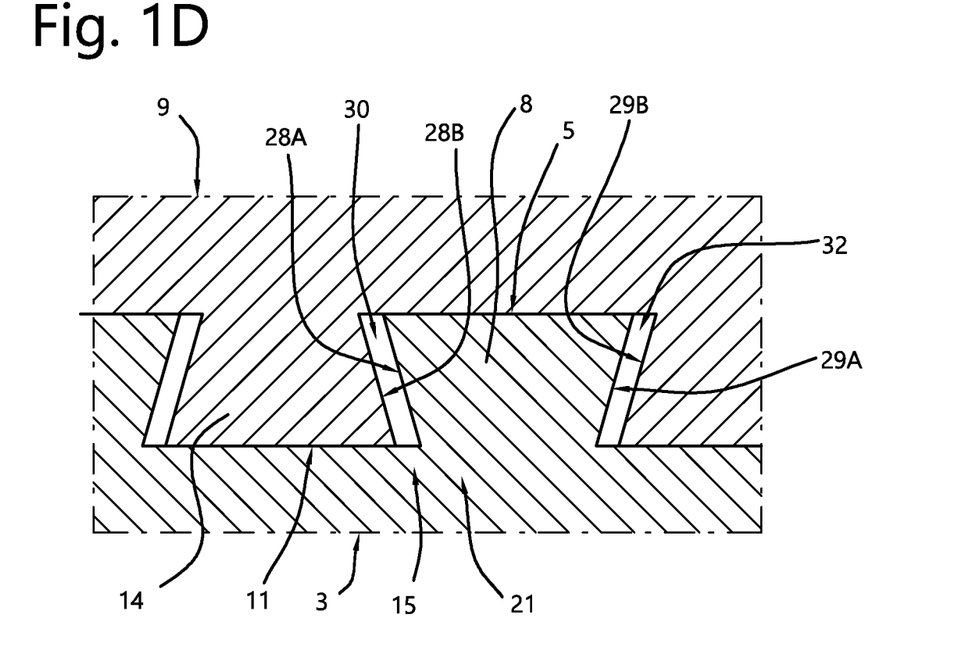
Figure 1E:
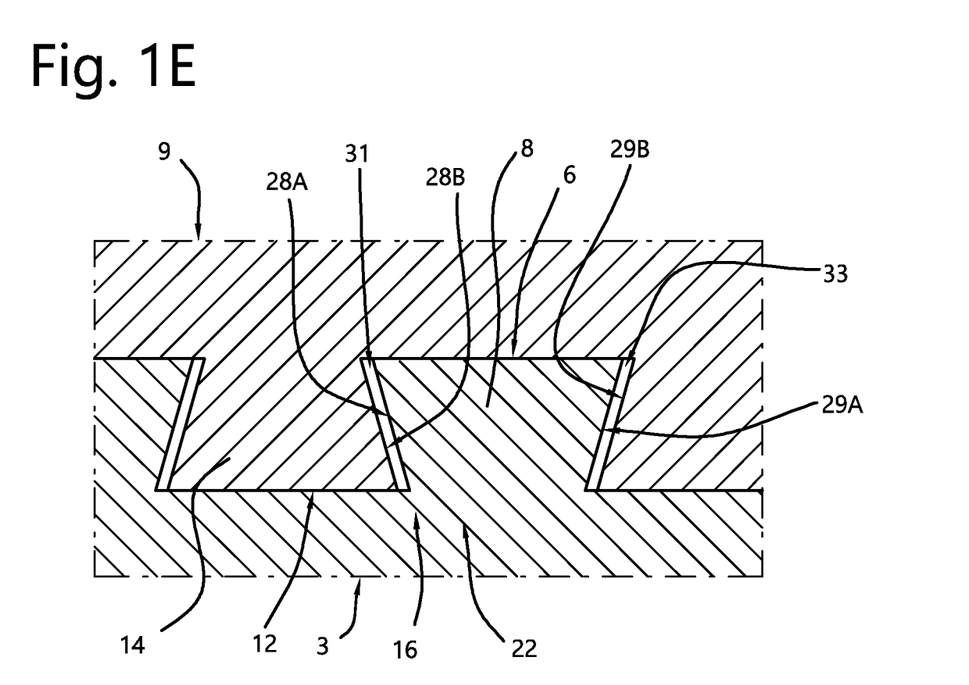

The FIGS. 1D and 1E schematically show an enlarge view of the parts D and E of FIG. 1A, respectively, during the major part of the rotational make-up. The wedge threads 8 of the two-step wedge pin thread 4 have stab flanks 28A and load flanks 29A. The wedge threads 14 of the two-step wedge box thread 10 have stab flanks 28B and load flanks 29B.

The wedge threads 8, 14 of the small diameter wedge thread set 15 comprises a first stab flank clearance 30 at their stab flanks 28A, 28B (FIG. 1D). The wedge threads 8, 14 of the large diameter wedge thread set 16 comprises a second stab flank clearance 31 at their stab flanks 28A, 28B (FIG. 1E).

The wedge threads 8, 14 of the small diameter wedge thread set 15 comprises a first load flank clearance 32 at their load flanks 29A, 29B (FIG. 1D). The wedge threads 8, 14 of the large diameter wedge thread set 16 comprises a second load flank clearance 33 at their load flanks 29A, 29B (FIG. 1E).

The first stab flank clearance 30 and the first load flank clearance 32 are of the same size. The second stab flank clearance 31 and the second load flank clearance 33 are of the same size.

The first axial clearance 21 is formed by the first stab flank clearance 30 and the first load flank clearance 32. The second axial clearance 22 is formed by the second stab flank clearance 31 and the second load flank clearance 33.

Figure 1F:
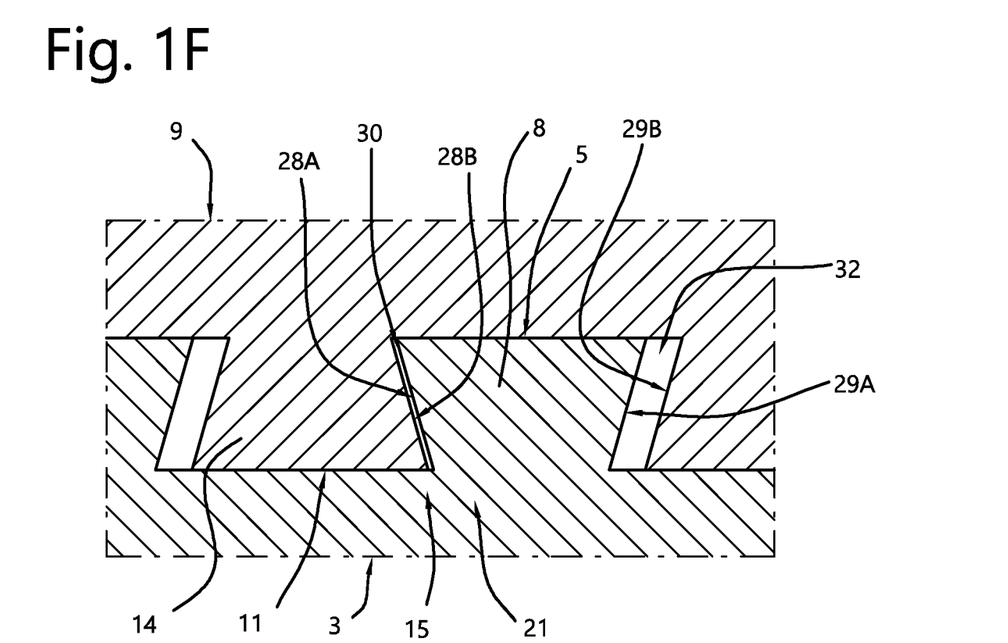
Figure 1G:
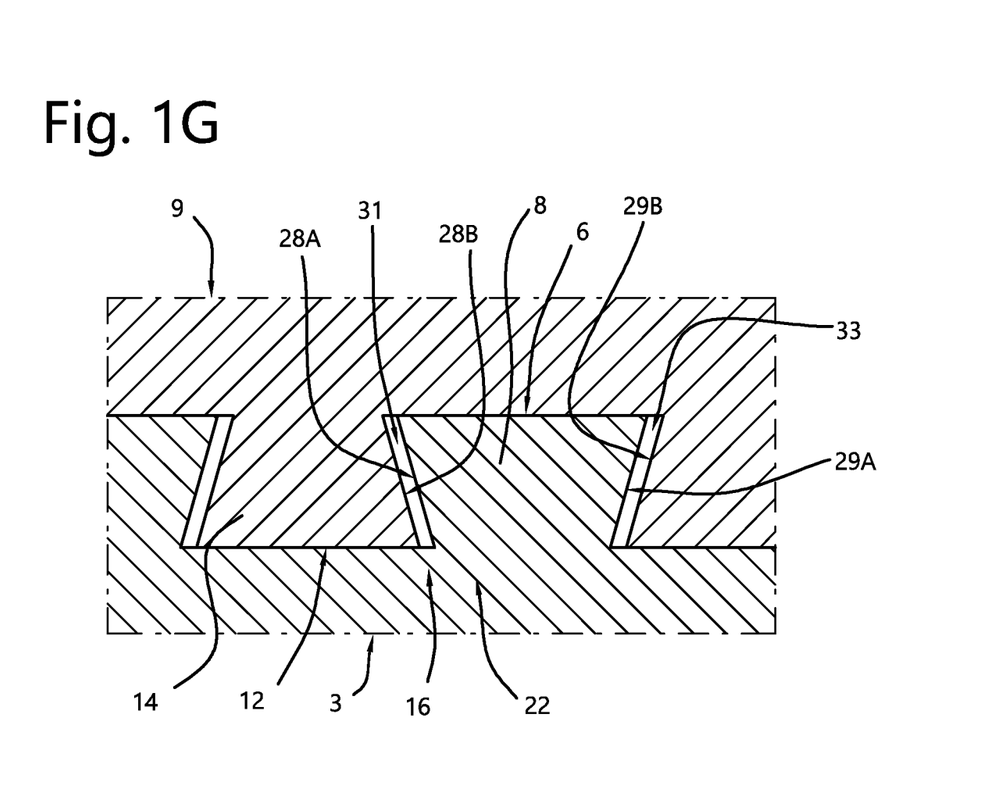

The FIGS. 1F and 1G show a first alternative embodiment for the FIGS. 1D and 1G, respectively. In this first alternative embodiment, the first stab flank clearance 30 is smaller than the second stab flank clearance 31. The first load flank clearance 32 is larger than the second load flank clearance 33.

Since the first axial clearance 21 is larger than the second axial clearance 22, the small diameter wedge thread set 15 might have a much lower torque interference when compared with the large diameter wedge thread set 16 when the make-up is completed. Making the first stab flank clearance 30 smaller than the second stab flank clearance 31 will result in higher torque interference at in the small diameter wedge thread set 15.

In another alternative embodiment, it is the first load flank clearance 32 that is made smaller than the second load flank clearance 32. The first stab flank clearance 30 will in that situation be larger than the second stab flank clearance 31.

Figure 1H:
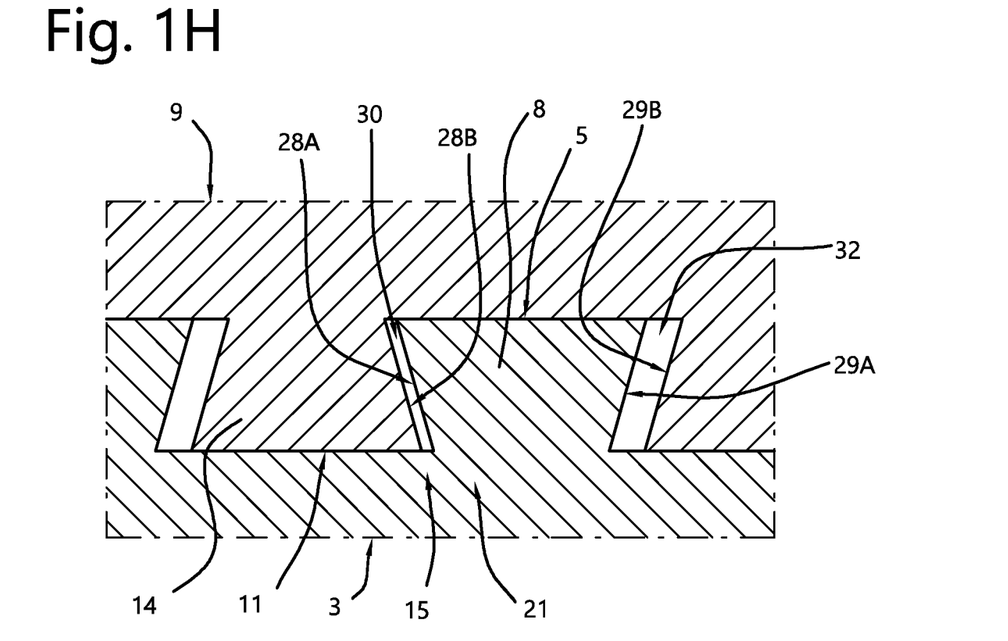
Figure 1I:
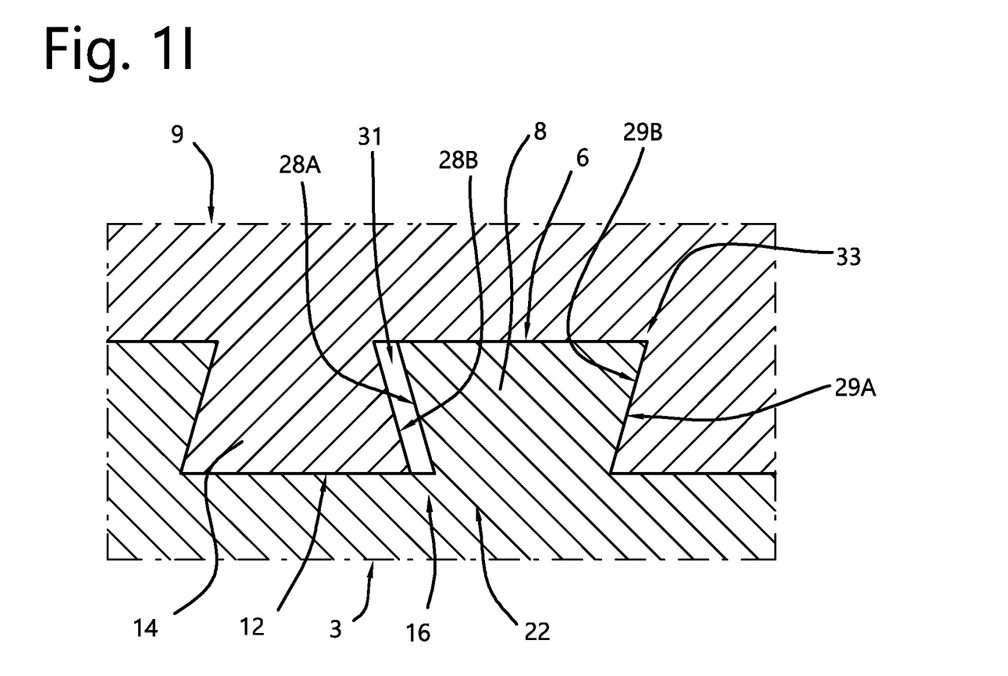

The FIGS. 1H and 1I show a second alternative embodiment for the FIGS. 1D and 1E, respectively. In this second alternative, the first stab flank clearance 30 is smaller than the second stab flank clearance 31. The first load flank clearance 32 is larger than the second load flank clearance 33. More specifically, the second load flank clearance 33 is 0 mm (meaning that the load flanks 29A, 29B are in contact with each other).

In addition, the first load flank clearance 32 is larger than the first stab flank clearance 30 and the second stab flank clearance 31 is larger than the second load flank clearance 33. This has a positive effect on the interference between the cooperating wedge threads 8, 14 of the wedge thread sets 15, 16.

The first stab flank clearance 30 is 0.013 mm, the first load flank clearance 32 is 0.038 mm, and the second stab flank clearance 31 is 0.025 mm. In another embodiment of the tubular connection 1, the first stab flank clearance 30 is between 0.010 and 0.015 mm, the first load flank clearance 32 is between 0.035 and 0.040 mm, and the second stab flank clearance 31 is between 0.023 and 0.028 mm.

As shown in FIG. 1A, the small diameter wedge thread set 15 (having the first axial clearance 21) is located between the radial metal to metal seal 17 and the further radial metal to metal seal 25. The make-up of the small diameter wedge thread set 15 is influenced by both radial metal to metal seals 17, 25. The radial interference at both radial metal to metal seals 17, 25 will move the pin member 3 inwards and move the box member 9 outwards. Since the small diameter wedge thread set 15 contains dovetail wedge thread 8, 14, this movement of the pin and box members 3, 9 will generate additional wedging between the dovetail wedge threads 8, 14.

Figure 2:
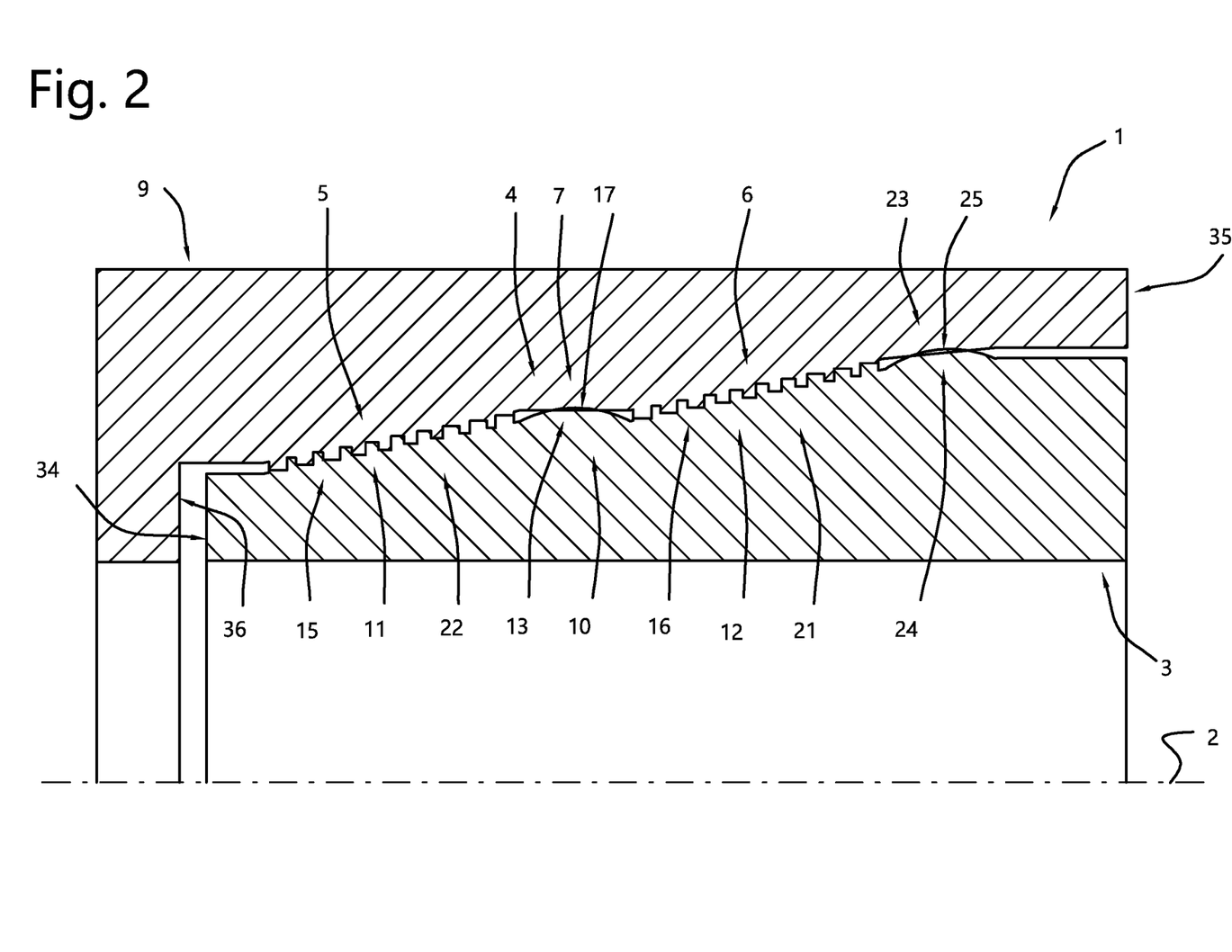

FIG. 2 shows a cross sectional view of a second embodiment of the tubular connection 1 according to the invention. This embodiment differs from FIG. 1 in that the large diameter wedge thread set 16 is dimensioned to have the first axial clearance 21 between its wedge threads 8, 14 during a major portion of the rotational make-up of the tubular connection 1, and the small diameter wedge thread set 15 is dimensioned to have the second axial clearance 22 between its wedge threads 8, 14 during said major portion of the rotational make-up of the tubular connection 1. In addition, the further radial metal to metal seal 25 is located near the box free end 35. The wedge thread set having the first axial clearance 21 is located further from the pin free end 34 than the wedge thread set having the second axial clearance 22.

Figure 3:
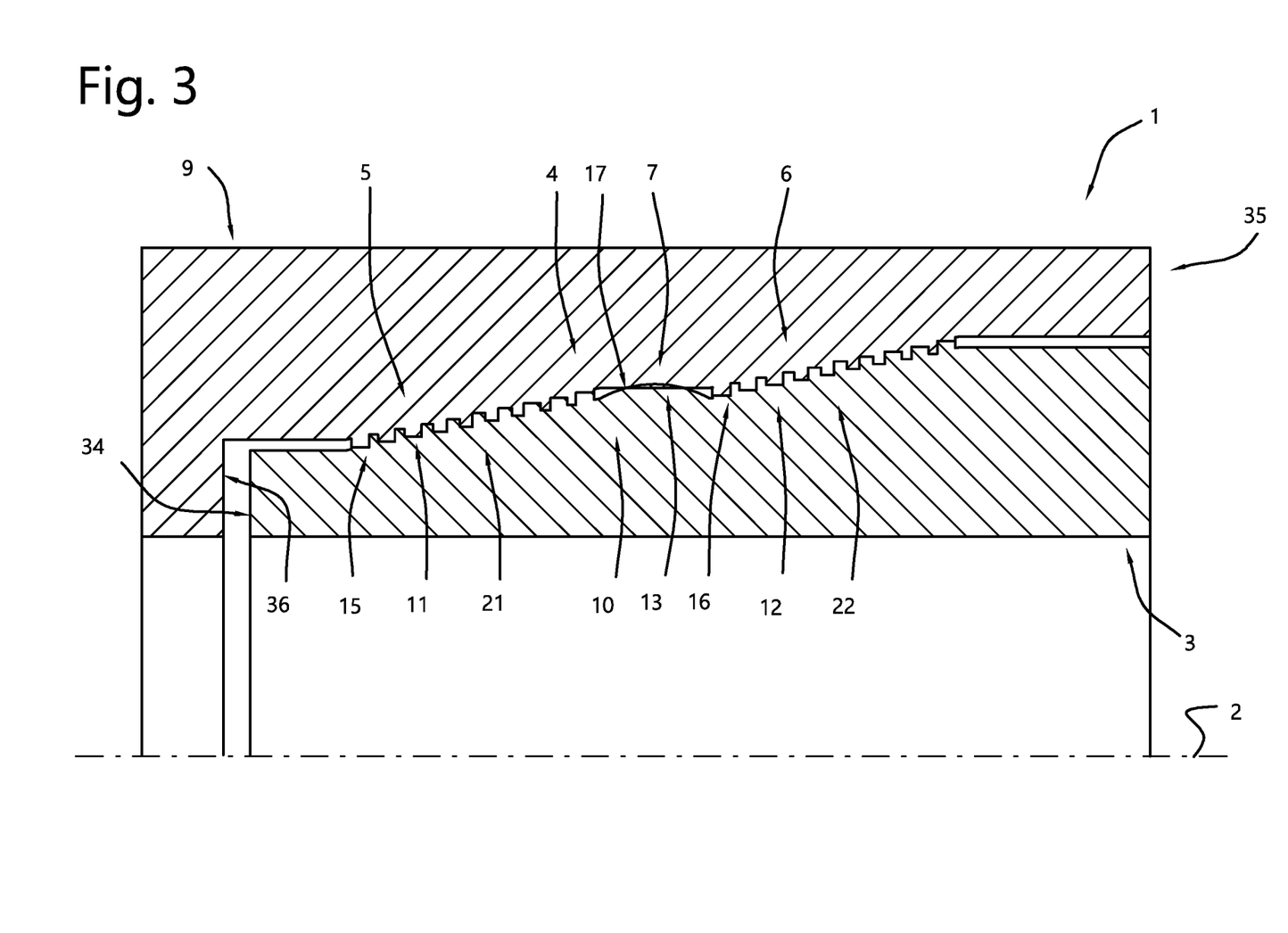

FIG. 3 shows a cross sectional view of a third embodiment of the tubular connection 1 according to the invention. This embodiment differs from FIG. 1 in that the tubular connection 1 comprises only one radial metal to metal seal 17. The small diameter wedge thread set 15 is dimensioned to have the first axial clearance 21 between its wedge threads 8, 14 during a major portion of the rotational make-up of the tubular connection 1, and the large diameter wedge thread set 16 is dimensioned to have the second axial clearance 22 between its wedge threads 8, 14 during said major portion of the rotational make-up of the tubular connection 1.

Figure 4:
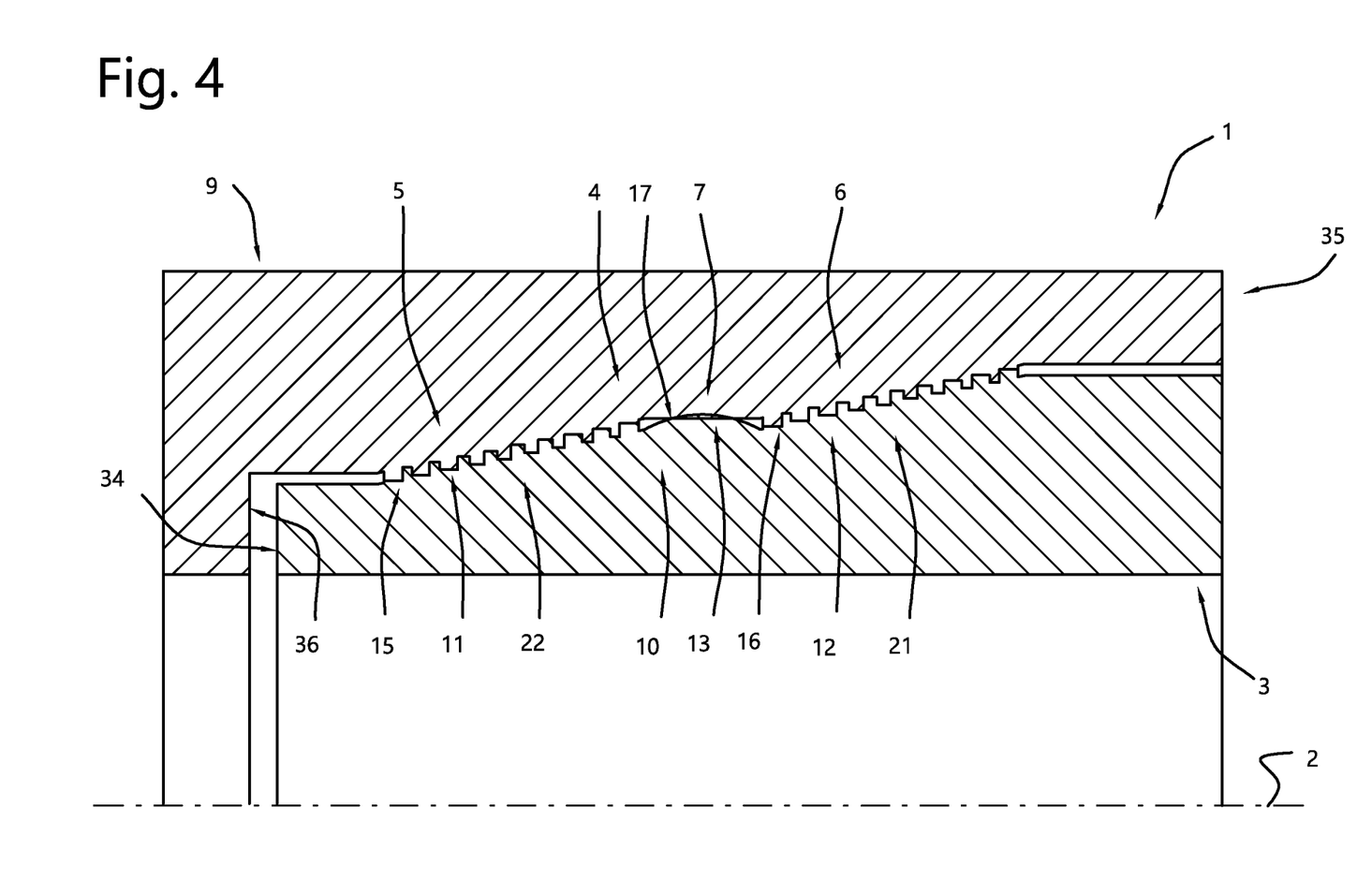

FIG. 4 shows a cross sectional view of a fourth embodiment of the tubular connection 1 according to the invention. This embodiment differs from FIG. 3 in that the large diameter wedge thread set 16 is dimensioned to have the first axial clearance 21 between its wedge threads 8, 14 during a major portion of the rotational make-up of the tubular connection 1, and the small diameter wedge thread set 15 is dimensioned to have the second axial clearance 22 between its wedge threads 8, 14 during said major portion of the rotational make-up of the tubular connection 1.

Figure 5:
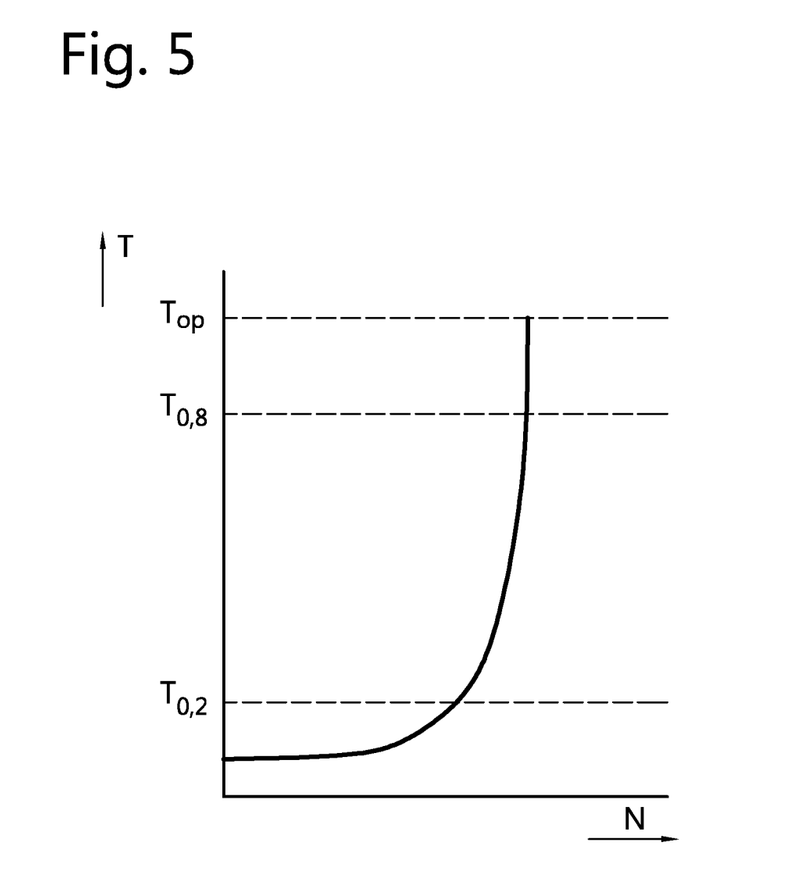

FIG. 5 shows a graph relating the make-up of the tubular connection of FIG. 1A. The relation between the revolutions (N) between the pin and box members 3, 9 and the make-up torque (T) is shown. The optimum make-up torque (Top) is indicated together with the levels of 20% ($T_{0.2}$) and 80% ($T_{0.8}$) of the optimum make-up torque. During make-up, the most relevant displacement between the pin and box sealing surfaces 7, 13 to obtain a secure radial metal to metal seal 17 is created between 20-80% of the optimum make-up torque.

The invention further relates to a threaded connection and method according to any of the following clauses.

1. Threaded tubular connection for drilling or operating hydrocarbon wells comprising:
    a longitudinal axis,
    a metal pin member having a tapered two-step wedge pin thread comprising a small diameter pin thread step, a large diameter pin thread step and a pin sealing surface located between the small and large diameter pin thread steps, wherein the small diameter pin thread step and the large diameter pin thread step each comprise external dovetail wedge threads, and
    a metal box member having a tapered two-step wedge box thread comprising a small diameter box thread step, a large diameter box thread step and a box sealing surface located between the small and large diameter box thread steps, wherein the small diameter box thread step and the large diameter box thread step each comprise internal dovetail wedge threads, wherein
    the wedge threads of the two-step wedge pin thread and of the two-step wedge box thread have stab flanks and load flanks,
    the small diameter pin and box thread steps are configured to cooperate during rotational make-up of the tubular connection and form a small diameter wedge thread set,
    the large diameter pin and box thread steps are configured to cooperate during rotational make-up of the tubular connection and form a large diameter wedge thread set,
    the pin sealing surface and the box sealing surface are configured to form a radial metal to metal seal,
    the tubular connection is free from any final make-up stop shoulder defining a final make-up position for the pin member relative to the box member,
    one of the small diameter wedge thread set and the large diameter wedge thread set is dimensioned to have a first axial clearance between its wedge threads during a major portion of the rotational make-up of the tubular connection and the other of the small diameter wedge thread set and the large diameter wedge thread set is dimensioned to have a second axial clearance between its wedge threads during said major portion of the rotational make-up of the tubular connection, which first axial clearance is larger than the second axial clearance.
2. Threaded tubular connection according to clause 1, wherein the wedge thread set having the second axial clearance governs the positioning of the pin sealing surface and the box sealing surface relative to each other during the major portion of the rotational make-up.
3. Threaded tubular connection according to clause 1 or 2, wherein the major portion of the rotational make-up of the tubular connection relates to applying a torque to the tubular connection during make-up which is between 20-80% of the optimum make-up torque.
4. Threaded tubular connection according to any one of the proceeding clauses, wherein the pin member comprises a further pin sealing surface, the box member comprises a further box sealing surface, the further pin sealing surface and the further box sealing surface are configured to cooperate with each to form a further radial metal to metal seal, and the wedge thread set having the first axial clearance is located between the radial metal to metal seal and the further radial metal to metal seal.
5. Threaded tubular connection according to any one of the clauses 1-3, wherein the tubular connection comprises only one radial metal to metal seal.
6. Threaded tubular connection according to any one of the proceeding clauses, wherein
    the wedge threads of the wedge thread set having the first axial clearance comprises a first stab flank clearance at their stab flanks and a first load flank clearance at their load flanks, and
    the wedge threads of the wedge thread set having the second axial clearance comprises a second stab flank clearance at their stab flanks and a second load flank clearance at their load flanks.
7. Threaded tubular connection according to clause 6, wherein the first stab flank clearance is smaller than the second stab flank clearance.
8. Threaded tubular connection according to clause 6 or 7, wherein the first stab flank clearance is equal to the second stab flank clearance minus between 0.010 and 0.015 mm (or minus 0.013 mm).
9. Threaded tubular connection according to any one of the clauses 6-8, wherein the first load flank clearance is larger than the second load flank clearance.
10. Threaded tubular connection according to any one of the clauses 6-9, wherein the second load flank clearance is 0 mm.
11. Threaded tubular connection according to any one of the clauses 6-10, wherein the first stab flank clearance is between 0.010 and 0.015 mm (or is 0.013 mm), the first load flank clearance is between 0.035 and 0.040 mm (or is 0.038 mm), and the second stab flank clearance is between 0.023 and 0.028 mm (or is 0.025 mm).

12. Threaded tubular connection according to any one of the clauses 6-11, wherein the first load flank clearance is larger than the first stab flank clearance and/or the second stab flank clearance is larger than the second load flank clearance.

13. Threaded tubular connection according to any one of the proceeding clauses, wherein the pin member comprises a pin free end and the wedge thread set having the first axial clearance is located closer to the pin free end than the wedge thread set having the second axial clearance.

14. Threaded tubular connection according to any one of the clauses 1-12, wherein the pin member comprises a pin free end and the wedge thread set having the first axial clearance is located further from the pin free end than the wedge thread set having the second axial clearance.

15. Threaded tubular connection according to any one of the proceeding clauses, wherein the first axial clearance and the second axial clearance are 0 mm at the optimum make-up torque.

16. Method of making up a threaded tubular connection according to any of preceding clauses, comprising the steps of;
    selecting the wedge thread set having the second axial clearance as a reference thread set for the rotational make-up of the tubular connection, and
    controlling the make-up of the threaded tubular connection on basis of the reference thread set to position the pin sealing surface and the box sealing surface relative to each other.

17. Method according to clause 16, wherein the positioning of the pin and box sealing surfaces relative to each other is controlled by applying a torque on the tubular connection from 20% of the optimum make-up torque until 80% of the optimum make-up torque.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

It will be apparent to those skilled in the art that various modifications can be made to the threaded tubular connection and the method without departing from the scope as defined in the claims and clauses.

The invention claimed is:

1. A threaded tubular connection for drilling or operating hydrocarbon wells comprising:
    a longitudinal axis;
    a metal pin member having a tapered two-step wedge pin thread comprising a small diameter pin thread step, a large diameter pin thread step and a pin sealing surface located between the small and large diameter pin thread steps, wherein the small diameter pin thread step and the large diameter pin thread step each comprise external dovetail wedge threads; and
    a metal box member having a tapered two-step wedge box thread comprising a small diameter box thread step, a large diameter box thread step and a box sealing surface located between the small and large diameter box thread steps, wherein the small diameter box thread step and the large diameter box thread step each comprise internal dovetail wedge threads; and
    wherein;
        the wedge threads of the two-step wedge pin thread and of the two-step wedge box thread have stab flanks and load flanks,
        the small diameter pin and box thread steps are configured to cooperate during rotational make-up of the tubular connection and form a small diameter wedge thread set,
        the large diameter pin and box thread steps are configured to cooperate during rotational make-up of the tubular connection and form a large diameter wedge thread set,
        the pin sealing surface and the box sealing surface are configured to form a radial metal to metal seal,
        the tubular connection is free from any final make-up stop shoulder defining a final make-up position for the pin member relative to the box member,
        one of the small diameter wedge thread set and the large diameter wedge thread set is dimensioned to have a first axial clearance between its wedge threads during a major portion of the rotational make-up of the tubular connection and the other of the small diameter wedge thread set and the large diameter wedge thread set is dimensioned to have a second axial clearance between its wedge threads during said major portion of the rotational make-up of the tubular connection, which first axial clearance is larger than the second axial clearance, and
        the major portion of the rotational make-up of the tubular connection relates to applying a torque to the tubular connection during make-up which is between 20-80% of an optimum make-up torque.

2. The threaded tubular connection according to claim 1, wherein the wedge thread set having the second axial clearance governs the positioning of the pin sealing surface and the box sealing surface relative to each other during the major portion of the rotational make-up.

3. The threaded tubular connection according to claim 1, wherein the first axial clearance and the second axial clearance are 0 mm at the optimum make-up torque.

4. The threaded tubular connection according to claim 1, wherein the pin member comprises a further pin sealing surface, the box member comprises a further box sealing surface, the further pin sealing surface and the further box sealing surface are configured to cooperate with each to form a further radial metal to metal seal, and the wedge thread set having the first axial clearance is located between the radial metal to metal seal and the further radial metal to metal seal.

5. The threaded tubular connection according to claim 1, wherein the tubular connection comprises only one radial metal to metal seal.

6. The threaded tubular connection according to claim 1, wherein
the wedge threads of the wedge thread set having the first axial clearance comprises a first stab flank clearance at their stab flanks and a first load flank clearance at their load flanks, and
the wedge threads of the wedge thread set having the second axial clearance comprises a second stab flank clearance at their stab flanks and a second load flank clearance at their load flanks.

7. The threaded tubular connection according to claim 6, wherein the first stab flank clearance is smaller than the second stab flank clearance.

8. The threaded tubular connection according to claim 6, wherein the first stab flank clearance is equal to the second stab flank clearance minus between 0.010 and 0.015 mm (or minus 0.013 mm).

9. The threaded tubular connection according to claim 6, wherein the first load flank clearance is larger than the second load flank clearance.

10. The threaded tubular connection according to claim 6, wherein the second load flank clearance is 0 mm.

11. The threaded tubular connection according to claim 6, wherein the first stab flank clearance is between 0.010 and 0.015 mm (or is 0.013 mm), the first load flank clearance is between 0.035 and 0.040 mm (or is 0.038 mm), and the second stab flank clearance is between 0.023 and 0.028 mm (or is 0.025 mm).

12. The threaded tubular connection according to claim 6, wherein the first load flank clearance is larger than the first stab flank clearance and/or the second stab flank clearance is larger than the second load flank clearance.

13. The threaded tubular connection according to claim 1, wherein the pin member comprises a pin free end and the wedge thread set having the first axial clearance is located closer to the pin free end than the wedge thread set having the second axial clearance.

14. The threaded tubular connection according to claim 1, wherein the pin member comprises a pin free end and the wedge thread set having the first axial clearance is located further from the pin free end than the wedge thread set having the second axial clearance.

15. A method of making up a threaded tubular connection, comprising the steps of;
providing a threaded tubular connection including:
a longitudinal axis,
a metal pin member having a tapered two-step wedge pin thread comprising a small diameter pin thread step, a large diameter pin thread step and a pin sealing surface located between the small and large diameter pin thread steps, wherein the small diameter pin thread step and the large diameter pin thread step each comprise external dovetail wedge thread, and
a metal box member having a tapered two-step wedge box thread comprising a small diameter box thread step, a large diameter box thread step and a box sealing surface located between the small and large diameter box thread steps, wherein the small diameter box thread step and the large diameter box thread step each comprise internal dovetail wedge threads, and
wherein:
the wedge threads of the two-step wedge pin thread and of the two-step wedge box thread have stab flanks and load flanks,
the small diameter pin and box thread steps are configured to cooperate during rotational make-up of the tubular connection and form a small diameter wedge thread set,
the large diameter pin and box thread steps are configured to cooperate during rotational make-up of the tubular connection and form a large diameter wedge thread set,
the pin sealing surface and the box sealing surface are configured to form a radial metal to metal seal,
one of the small diameter wedge thread set and the large diameter wedge thread set is dimensioned to have a first axial clearance between its wedge threads during a major portion of the rotational make-up of the tubular connection and the other of the small diameter wedge thread set and the large diameter wedge thread set is dimensioned to have a second axial clearance between its wedge threads during said major portion of the rotational make-up of the tubular connection, which first axial clearance is larger than the second axial clearance;
selecting the wedge thread set having the second axial clearance as a reference thread set for the rotational make-up of the tubular connection, and
controlling the make-up of the threaded tubular connection on basis of the reference thread set to position the pin sealing surface and the box sealing surface relative to each other.

16. The method according to claim 15, wherein the positioning of the pin and box sealing surfaces relative to each other is controlled by applying a torque on the tubular connection from 20% of the optimum make-up torque until 80% of the optimum make-up torque.

17. The threaded tubular connection according to claim 6, wherein the pin member comprises a pin free end and the wedge thread set having the first axial clearance is located closer to the pin free end than the wedge thread set having the second axial clearance.

18. The threaded tubular connection according to claim 6, wherein the pin member comprises a pin free end and the wedge thread set having the first axial clearance is located further from the pin free end than the wedge thread set having the second axial clearance.

19. The threaded tubular connection according to claim 1, wherein the small diameter wedge thread set is dimensioned to have the first axial clearance between its wedge threads during the major portion of the rotational make-up of the tubular connection and the large diameter wedge thread set is dimensioned to have the second axial clearance between its wedge threads during the major portion of the rotational make-up of the tubular connection.

20. The threaded tubular connection according to claim 6, wherein the small diameter wedge thread set is dimensioned to have the first axial clearance between its wedge threads during the major portion of the rotational make-up of the tubular connection and the large diameter wedge thread set is dimensioned to have the second axial clearance between its wedge threads during the major portion of the rotational make-up of the tubular connection.

* * * * *